United States Patent
Gou et al.

(10) Patent No.: US 9,569,510 B2
(45) Date of Patent: Feb. 14, 2017

(54) CROWD-POWERED SELF-IMPROVING INTERACTIVE VISUALANALYTICS FOR USER-GENERATED OPINION DATA

(71) Applicant: International Business Machines Corporation, Armonk, NY (US)

(72) Inventors: Liang Gou, San Jose, CA (US); Eben Haber, Cupertino, CA (US); Mengdie Hu, Atlanta, GA (US); Eser Kandogan, Mountain View, CA (US); Yunyao Li, San Jose, CA (US); Huahai Yang, San Jose, CA (US); Michelle Xue Zhou, Saratoga, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 265 days.

(21) Appl. No.: 14/041,569

(22) Filed: Sep. 30, 2013

(65) Prior Publication Data
US 2015/0095311 A1    Apr. 2, 2015

(51) Int. Cl.
G06F 17/30    (2006.01)

(52) U.S. Cl.
CPC .............................. *G06F 17/30554* (2013.01)

(58) Field of Classification Search
None
See application file for complete search history.

(56) References Cited

U.S. PATENT DOCUMENTS

| | | | |
|---|---|---|---|
| 8,600,796 B1 * | 12/2013 | Sterne et al. | 705/7.33 |
| 2008/0154883 A1 * | 6/2008 | Chowdhury et al. | 707/5 |
| 2009/0265307 A1 | 10/2009 | Reisman et al. | |
| 2009/0319342 A1 * | 12/2009 | Shilman et al. | 705/10 |
| 2011/0179009 A1 | 7/2011 | Nam | |
| 2011/0246921 A1 * | 10/2011 | Mercuri et al. | 715/771 |
| 2012/0317049 A1 * | 12/2012 | Hao et al. | 705/347 |
| 2013/0046756 A1 * | 2/2013 | Hao et al. | 707/723 |
| 2013/0054638 A1 | 2/2013 | Kim | |

(Continued)

OTHER PUBLICATIONS

OpinionBlocks: A Crowd-Powered, Self-improving Interactive Visual Analytic System for Understanding Opinion Text; Mengdie Hu, Huahai Yang, Michelle X Zhou, Liang Gou, Yunyao Li, Eben Haber; Human-Computer Interaction—Interact 2013, 10 pages.

(Continued)

*Primary Examiner* — Khanh Pham
(74) *Attorney, Agent, or Firm* — Cantor Colburn LLP (57) ABSTRACT

Embodiments relate to interacting with a collection of user opinion documents associated with a topic. One aspect includes obtaining opinion data for the collection of opinion documents associated with the topic. The opinion data includes one or more features discussed in the opinion documents, one or more key phrases included in each feature, one or more text snippets included in each feature, and at least one sentiment expressed in each text snippet. A visual interface is provided in which a feature summary view of the opinion documents acts a top level of a navigational hierarchy. The visual interface allows user navigation from the top level to a lower level of the navigational hierarchy in order to display more details about a text snippet, as compared to the feature summary view, while continuing to provide the feature summary view.

16 Claims, 6 Drawing Sheets

(56) References Cited

U.S. PATENT DOCUMENTS

2013/0185175 A1* 7/2013 Roozen et al. ............ 705/26.64
2013/0215137 A1* 8/2013 Hao et al. ..................... 345/593

OTHER PUBLICATIONS

OpinionBlocks: Visualizing Consumer Reviews; Basak Alper, Huahai Yang, Eben Haber, Eser Kandogan; Proceedings of the IEEE VisWeek Workshop on Interactive Text Analytics for Decision Making, 2011; 4 pages.

* cited by examiner

CROWD-POWERED SELF-IMPROVING INTERACTIVE VISUAL ANALYTICS FOR USER-GENERATED OPINION DATA

BACKGROUND

The present disclosure relates generally to visual analytics, and more specifically, to a system for visualizing user-generated opinion data.

Systems that allow users to create opinions or reviews about various subjects and provide these opinions on the Internet are commonplace. For example, many electronic commerce sites allow users to submit reviews about products available on the site. Users also express opinions about many different topics on social networking sites. Users are often interested in what other users have to say, but may find navigating through a large body of reviews or opinions to be a daunting task. Some conventional solutions to viewing a body of reviews or opinions allow users to vote on the helpfulness of each review, and direct users to the most helpful favorable and critical reviews, based on these votes. Other conventional solutions provide an overview of the most frequently mentioned product/service features, and the overall sentiment expressed in a collection of reviews, then allow users to filter and rank reviews based on the features mentioned.

SUMMARY

Embodiments include a method, system, and computer program product for user interaction with a collection of user opinion documents associated with a topic. The method includes obtaining opinion data for the collection of opinion documents associated with the topic. The opinion data includes one or more features discussed in the opinion documents, one or more key phrase included in the features, one or more text snippets included in the features, and at least one sentiment expressed in the feature. The method also includes providing, in a visual interface, a feature summary view of the opinion documents as a top level of a navigational hierarchy. The method also includes allowing user navigation from the top level to a lower level of the navigational hierarchy.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Embodiments described herein are directed to methods, systems and computer program products interacting with a collection of user opinion documents associated with a topic. A visual interface allows a user to navigate between a top-level summary view which focuses on features, sentiments, and a summary of text snippets, and a lower-level view that adds more detail about particular text snippets and/or full opinion text. Notably, the summary information is still displayed in the lower-level view to provide context for the user. Embodiments of the visual interface disclosed herein support three common opinion-reading tasks: viewing a summary of the most frequently mentioned topics; learn about the rationale behind reviewers' opinions and sentiment by examining the relevant snippets from the reviews; and view the full opinion context by reading the full text of the opinion.

Figure 1:
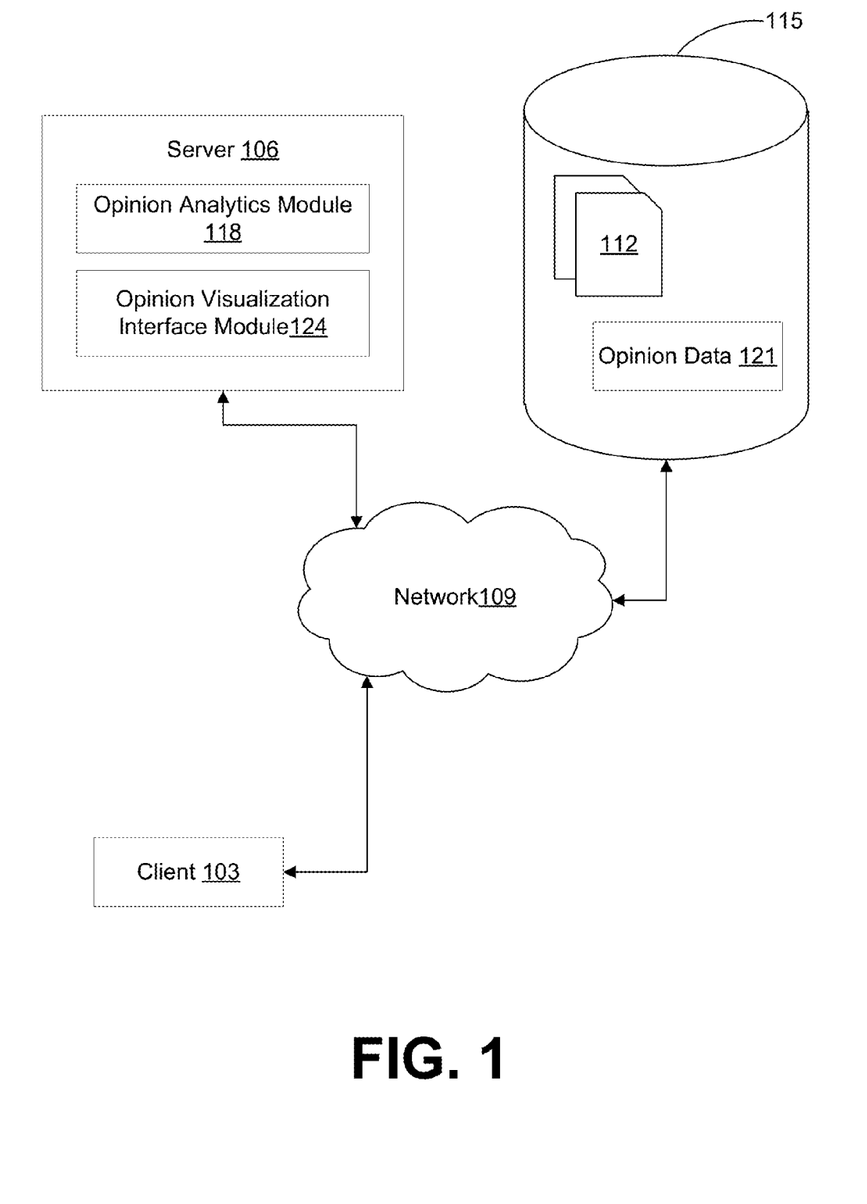
FIG. 1 depicts a networked environment for practicing the teachings herein, in accordance with an embodiment.

Referring now to FIG. 1, a networked environment including visual analytics system, according to one embodiment, is illustrated. Networking environment 100 includes one or more clients 103 in communication with a server 106 over a network 109 such as the Internet. Server 106 retrieves web pages 112 in response to requests from a program such as a browser executing on a client 103. These functions may be provided, for example, by a web server module executing on server 106 and a browser executing on client 103. Web page 112 are stored in data storage 115 that is accessible to server 106.

A set of web pages 112 may be organized in a hierarchy and perceived by the user as a web site, for example, an electronic commerce site, a social networking site, a news site, or a movie review site. While browsing a web site, the user may provide his opinion by entering or uploading text to a particular web page 112. For example, a user may enter a product review while viewing information about a product on an electronic commerce web site, or an opinion about a restaurant while viewing a friend's page on a social networking web site.

An opinion analytics module 118 executing on server 106 may process a collection of user-created opinion documents for a particular topic as follows. Opinion analytics module 118 examines a particular collection of opinion documents (e.g., opinions for a particular product), identifies the main topic of the collection, and automatically extracts various types of opinion data 121 from the collection of opinion documents, using various mining and machine learning techniques. Extracted opinion data 121 may include features discussed in a particular collection of opinion document, key phrases appearing in the feature discussion, and text snippets appearing in the feature discussion. Opinion data 121 is stored in data storage 115. In some embodiments, opinion data 121 is stored in a database for efficient retrieval. The system shown in FIG. 1 stores multiple collections of opinion documents, each specific to a particular topic, i.e., each containing opinions from multiple users on the same topic. Other embodiments group opinions for many different topics into an opinion corpus. Such embodiments may nonetheless support retrieval and manipulation of all opinion data 121 for a particular topic.

Client 103 provides an opinion visualization interface module 124 that retrieves opinion data 121 for a particular topic, and presents the opinion data in a manner that allows a user to efficiently navigate the collection of opinions for the topic. Opinion visualization interface module 124 thus allows a user to better understand the set of user-generated opinions for this topic. As described in more detail below, opinion visualization interface module 124 presents a feature-based visual summary of the collection of opinion documents that pertains to a particular topic. Opinion visualization interface module 124 allows the user to navigate the opinion documents for a topic in a hierarchical manner, starting at a top-level feature summary view. As the user navigates down the hierarchy, opinion visualization interface module 124 progressively displays increasingly detailed information, including text from different opinions. Yet even when showing details, opinion visualization interface module 124 continues to provide the feature summary view to convey summaries of the opinion documents in a visual manner.

Some embodiments of opinion visualization interface module 124 also allow the user to interactively correct and report errors in opinion documents (e.g., incorrectly identified sentiment) as these errors are encountered during visual interaction with the opinion documents. Client 103 communicates this error information to an opinion error correction module 127 executing on server 106, which updates opinion data 121 to improve the visual summary for future readers. The error correction features will be described later in connection with FIG. 6.

Before describing the visual interface generated by opinion visualization interface module 124, an overall description of how opinion data 121 relates to opinion document will now be provided. An opinion document created by a user contains various fragments of text (referred to herein as text snippets) that express opinions about a feature of the topic of the opinion document. For example, a book review might contain sentences or phrases that describe the plot and the main character, and might also mention the author. Given such data, opinion analytics module 118 might then identify plot, main character, and author as features. Opinion analytics module 118 also identifies, as text snippets, the particular fragments describing these features, and associates each text snippet with the particular feature it describes. Each text snippet also expresses a sentiment, or overall user feeling, about the feature. In some embodiments, sentiments are classified as positive, negative, or neutral. A text snippet might also contain a key phrase, which can be a single word or a group of words. For example, key phrases for a tablet computer might be "extremely light weight" and "long battery life," and both of these might be associated with the feature "portability." In some embodiments, those groups of words which appear in opinion document with the highest frequency are identified as key phrases.

Figure 2:
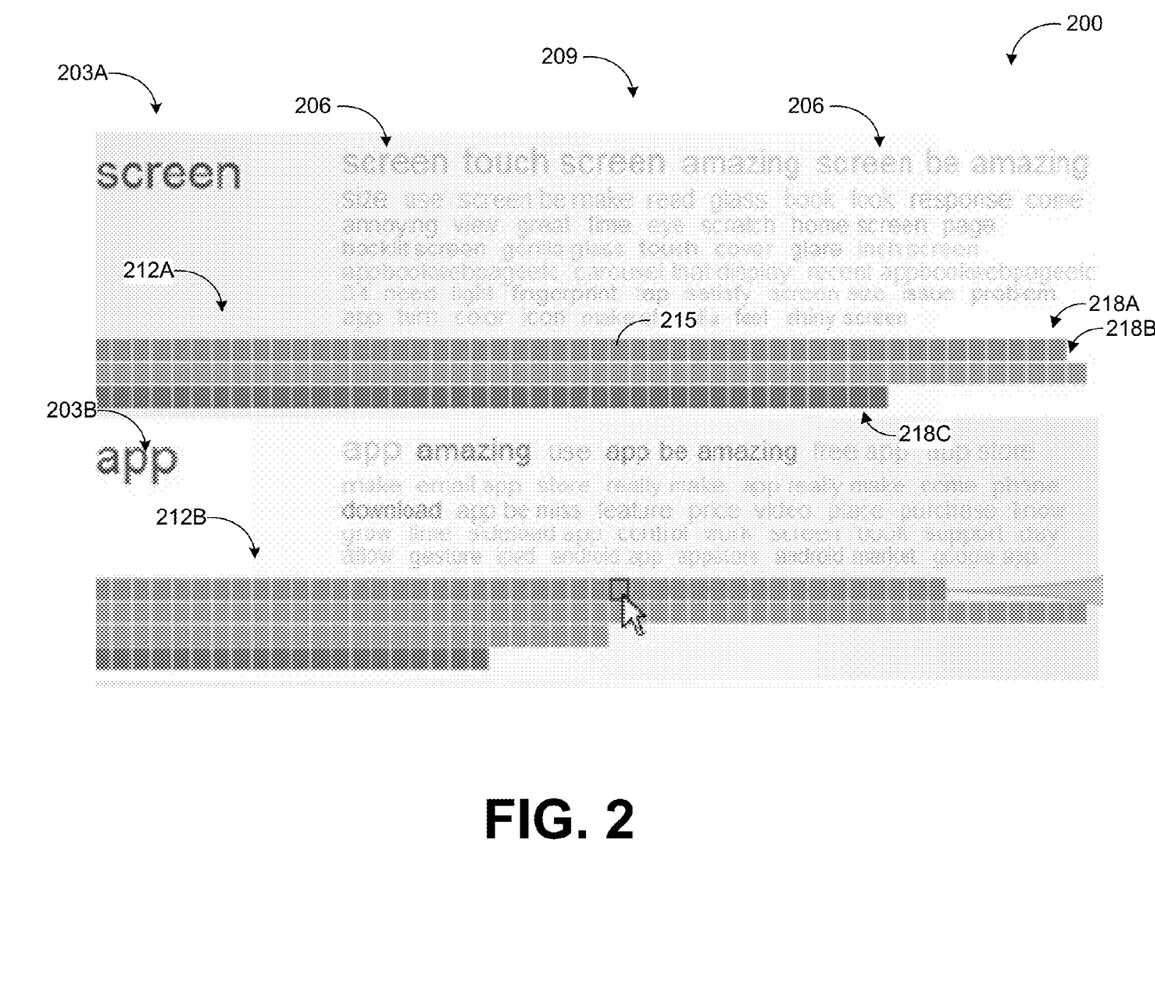
FIG. 2 depicts a visual interface having a feature summary view in accordance with an embodiment.

Referring now to FIG. 2, a visual interface having a feature summary view 200 in accordance with an embodiment is illustrated. Before generating feature summary view 200, opinion visualization interface module 124 retrieves opinion data 121 for a particular topic from opinion analytics module 118. This may be initiated, for example, as a result of a user search, or user navigation to a product web page or a particular page on a social networking site. Opinion visualization interface module 124 then processes opinion data 121 and uses it to build feature summary view 200. Once built, feature summary view 200 is displayed in a window. The feature summary view 200 will now be described in further detail.

Feature summary view 200 is composed of various controls. More specifically, interface 124 populates feature summary view 200 with a feature control 203 for each feature contained in opinion data 121 (representing a particular collection of opinion document). The embodiment of FIG. 2 includes two feature controls 203A and 203B, arranged vertically in the window. From top to bottom, the features are ordered by number of mentions in the collection. In this embodiment, feature control 203 also includes a list of key phrases 206, arranged in a word-cloud 209, in which the key phrases appear in decreasing order of frequency, starting with the most common. In this embodiment, the key phrases 206 are also color-coded by sentiment.

Opinion visualization interface module 124 also populates each feature control 203 with a single snippet summary control 212 representing all the text snippets that describe the corresponding feature. The embodiment of FIG. 2 includes two snippet summary controls 212A and 212B, each positioned below the respective feature control 203A, B. Since a snippet summary control 212 conveys only summary information and not detail, the text of each snippet is not displayed in this view 200. Instead, each text snippet is represented by an instance of a the same symbol 215 (here, a square), with the symbols 215 arranged in rows 218 (here, 218A-C). As noted above, each text snippet expresses a sentiment. In some embodiments, the color of the snippet symbol 215 indicates the sentiment, with all the symbols 215 for the same sentiment being placed in the same row 218.

Feature summary view 200 thus conveys high level information such as the total number of text snippets associated with each feature, and the sentiment associated with each of the text snippets. Notably, the embodiment of feature summary view 200 depicted in FIG. 2 does not include information about specific text snippets other than the total number of text snippets and sentiment associated with each of the text snippets. While some embodiments of feature summary view 200 (such as the one in FIG. 2) do include the key phrases associated with the feature, view 200 does not identify which particular text snippet contains the key phrase.

In addition to this top-level view, opinion visualization interface module 124 also provides a lower-level view, and allows the user to navigate to the lower-level view from the top-level view. The lower-level view provides additional detail about text snippets, details that are absent from feature summary view 200, as explained above. Examples of two lower-level views will now be described.

Figure 3:
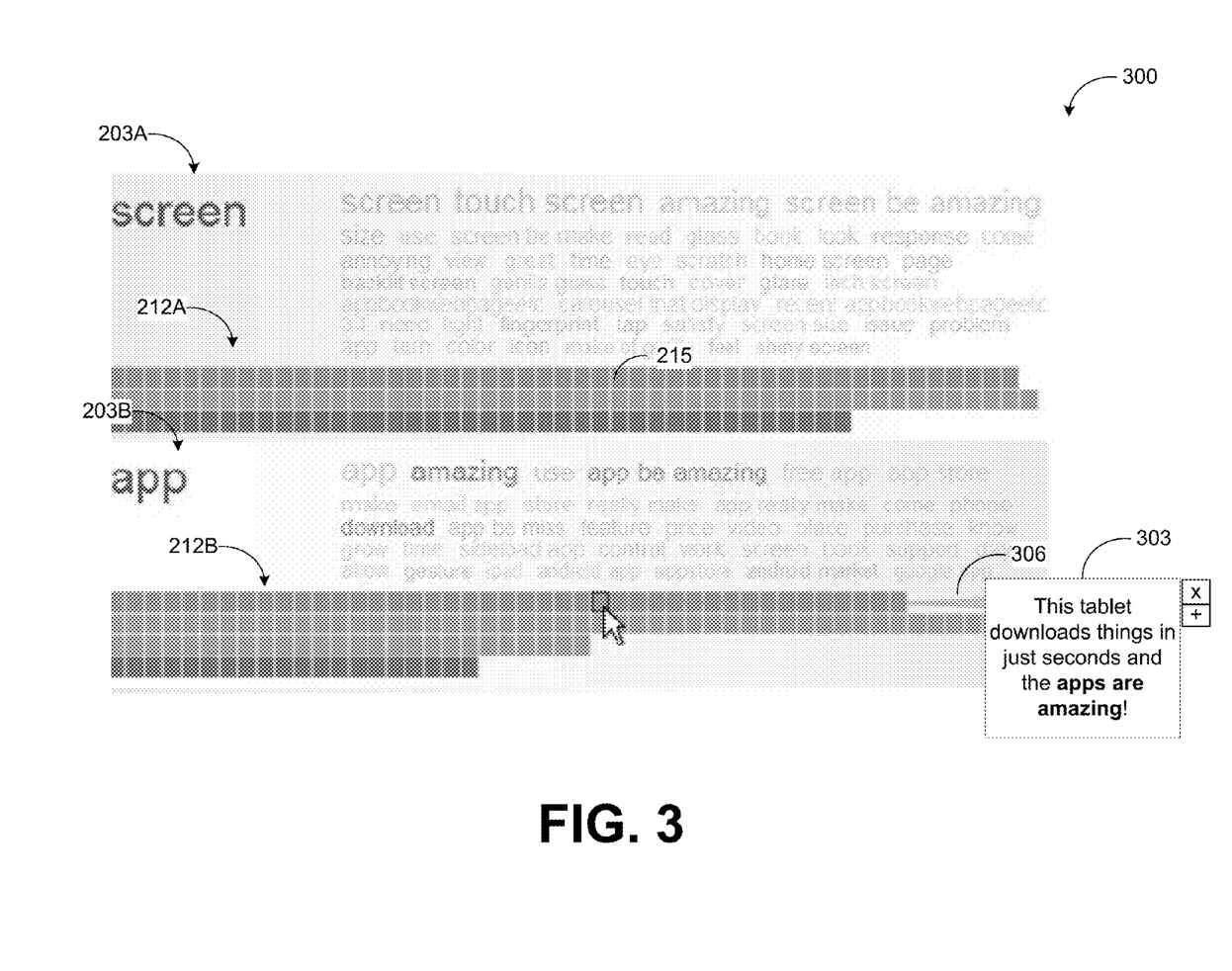
FIG. 3 depicts a visual interface having a text snippet view in accordance with an embodiment.

Referring now to FIG. 3, a visual interface having a text snippet view 300 in accordance with an embodiment is illustrated. Text snippet view 300 includes a snippet text box 303 which displays the text of a particular snippet. In some embodiments, text snippet view 300 is a lower-level view invoked from top-level feature summary view 200 by activating, such as by hovering over, a particular symbol 215, representing a single text snippet. Notably, text snippet view 300 maintains display of all feature controls 203, each with its associated snippet summary control 212, while adding one or more snippet text boxes 303. In this example, snippet text boxes 303 appear to the right of feature control 203. A connection line 306 is shown between the new snippet text box 303 and its corresponding snippet symbol 215 (no text). This provides a visual clue to help the user understand where the snippet fits into the collection.

In some embodiments, when snippet text box 303 is in focus, all associated key phrase 206 in word-cloud 209 are also highlighted. Hovering over a key phrase 206 in the word-cloud 209 causes opinion visualization interface module 124 to highlight only those symbols 215 corresponding to text snippets containing that key phrase 206. Clicking on the keyword or phrase then causes opinion visualization interface module 124 to display all relevant snippet text boxes 303 to the right of feature control 203.

Figure 4:
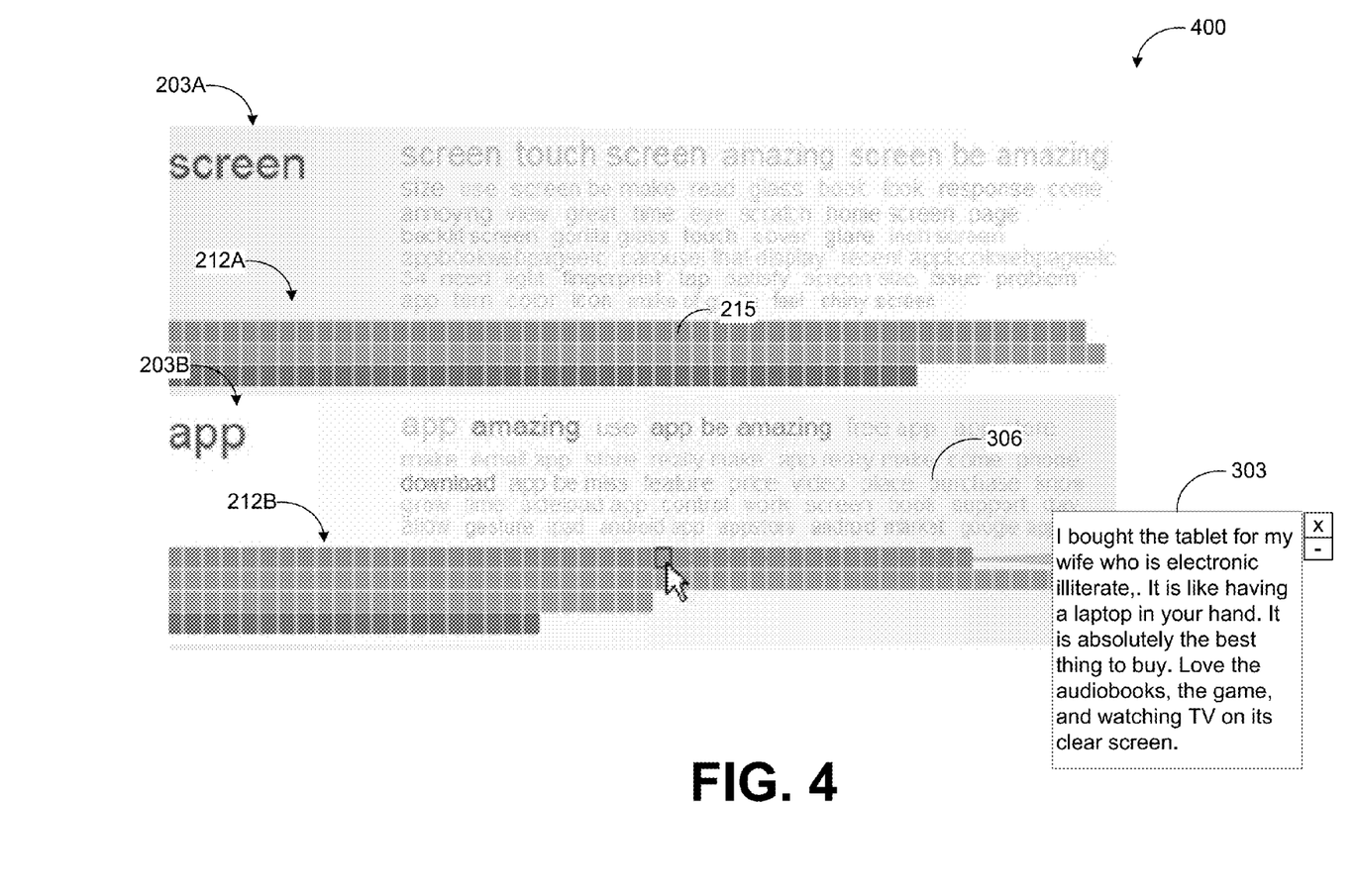
FIG. 4 depicts a visual interface having a full text view in accordance with an embodiment.

Referring now to FIG. FIG. 4, a visual interface having a full text view 400 in accordance with an embodiment is illustrated. Full text view 400 includes a full text box 403 which displays the full text of a particular opinion document. In some embodiments, full text view 400 is invoked from text snippet view 300 by activating a button associated with snippet text box 303 (e.g., an "expand" button). As an expansion of snippet text box 303, some embodiments may replace snippet text box 303 with full text box 403, or may display full text box 403 on top of snippet text box 303. Notably, full text view 400 maintains display of all feature controls 203, each with its associated snippet summary control 212. In some embodiments, in cases where a particular opinion document contains multiple text snippets, hovering over one of the snippet symbol 215 causes opinion visualization interface module 124 to also highlight other symbols 215 to show what other opinions are presented in the same opinion document.

Figure 5:
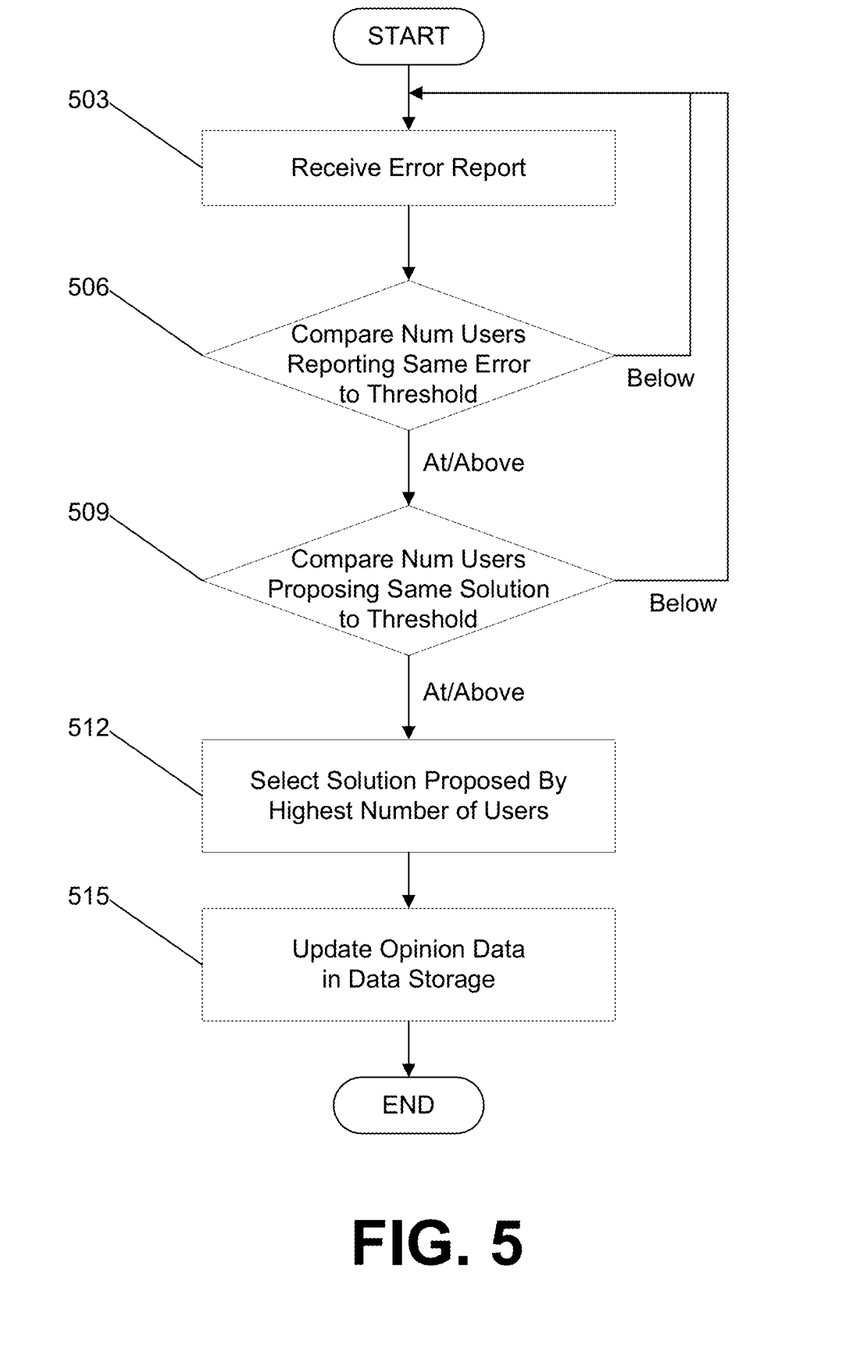
FIG. 5 depicts a process flow for user interaction with a collection of user opinion documents associated with a topic, in accordance with an embodiment.

Referring now to FIG. 5, a process flow of a method 500 for correcting errors in in accordance with an embodiment is illustrated. In this embodiment, method 500 includes, at block 503, opinion error correction module 127 receiving an opinion error report from a client 103. The opinion error report includes information about the specific piece of opinion data 121 that the user has identified as being in error, information describing the type of error, and information describing the user's proposed correction. Types of user-identified opinion errors are discussed in more detail below. As one example, a report may refer to a particular text snippet, and indicate that the text snippet is associated with an erroneous sentiment, or with an erroneous feature.

Next, as shown at block 506, the method 500 in this embodiment includes comparing the number of users who have reported the same error received at block 503. If the comparison at block 506 determines that the number of users reporting this same error is below a predetermined threshold, the method 500 returns to block 503 to await another error report. In this manner, contributions from a number of users are aggregated before processing.

The method 500 in this embodiment also includes another comparison at block 509, performed if the comparison at block 506 determines that the number of users reporting this same error is at or above a predetermined threshold. The second comparison at block 509 compares the number of users requesting the same correction. If the comparison at block 509 determines that the number of users requesting this same solution is below a predetermined threshold, the method 500 returns to block 503 to await another error report.

The method 500 in this embodiment also includes, as block 512, selecting the solution proposed by the largest number of users performed if the comparison at block 509 determines that the number of users reporting this same error is at or above a predetermined threshold. Finally, as shown at block 515, the method 500 includes updating opinion data 121 with the selected solution, thus correcting the error.

By integrating corrections from multiple users, embodiments of opinion error correction module 127 that incorporate method 500 improve the overall visual analytic system. The knowledge provided by multiple users and reflected in the updated opinion data 121 can improve the quality of the text analytics performed by opinion analytics module 118. Method 500 is thus powered by "the crowd" and is also self-improving. These improvements may be able to compensate for limitations in existing natural language processing (NLP) technologies. Notably, while conventional crowd-powered systems employ the crowd to help others, visual analytics systems that incorporate method 500 leverage the crowd of its own users, and motivates them to perform tasks that benefit both themselves and others (e.g., correctly identifying positives and negatives of a topic feature.

Although method 500 has updated opinion data 121 to reflect new contributions by user at block 515, the new opinion isn't necessarily reflected in the views 200, 300, and/or 400 generated by opinion visualization interface module 124. One embodiment of method 500 updates the visual interface to reflect user feedback immediately after qualified corrections are submitted (an "immediate mode"). This embodiment provides quick updates but may cause instability of the system. Other embodiments adopt user feedback in a "batch mode" to periodically incorporate all qualified corrections at the same time. The advantage of this embodiment is system stability. Some of the batch mode embodiments allow adjusting the update interval based on a variety of factors, including the number of users and the number of corrections made over a period of time.

While a user is making many changes to his/her own version of the views at the client 103, such changes may not be immediately propagated to other users of the system. In such cases, the user's own private copy of the views provided by the visual interface diverges from its public version. Some embodiments persist each user's changes for their own private view, yet still give users the ability to receive corrections made by others.

Some embodiments of opinion visualization interface module 124 allow the user to make these error reports interactively. In some embodiments, a user identifies a misclassified text snippet and then drags the corresponding snippet symbol 215 to the correct sentiment row 218, or out of the view entirely, if the text snippet contains no meaningful opinion. In some embodiments, a user clicks on a feature control 203 to change the name of the feature.

Figure 6:
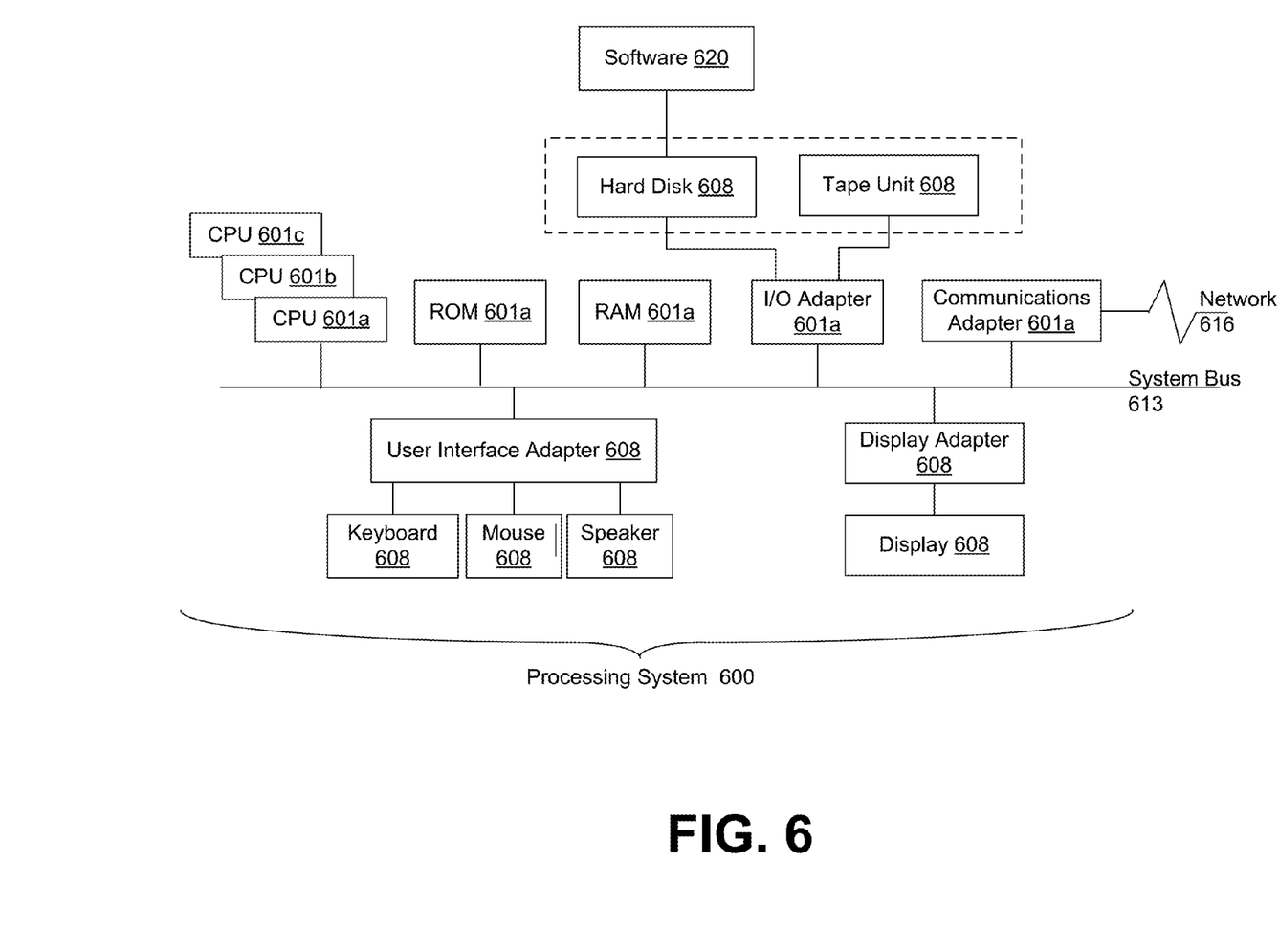
FIG. 6 depicts a processing system for practicing the teachings herein, in accordance with an embodiment.

Referring now to FIG. 6, there is shown an embodiment of a processing system 600 for implementing the teachings herein. In this embodiment, the processing system 600 has one or more central processing units (processors) 601a, 601b, 601c, etc. (collectively or generically referred to as processor(s) 601). Processors 601 are coupled to system memory 614 and various other components via a system bus 613. Read only memory (ROM) 602 is coupled to system bus 613 and may include a basic input/output system (BIOS), which controls certain basic functions of the processing system 600.

FIG. 6 further depicts an input/output (I/O) adapter 607 and a network adapter 606 coupled to the system bus 613. I/O adapter 607 may be a small computer system interface (SCSI) adapter that communicates with a hard disk 603 and/or tape storage drive 605 or any other similar component. I/O adapter 607, hard disk 603, and tape storage drive 605 are collectively referred to herein as mass storage 604. Software 620 for execution on processing system 600 may be stored in mass storage 604. Network adapter 606 interconnects system bus 613 with an outside network 616 enabling processing system 600 to communicate with other such systems. A screen (e.g., a display monitor) 615 is connected to system bus 613 by display adapter 612, which may include a graphics controller to improve the performance of graphics intensive applications and a video controller. In one embodiment, adapters 607, 606, and 612 may be connected to one or more I/O buses that are connected to system bus 413 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 613 via user interface adapter 608 and display adapter 612. A keyboard 609, mouse 640, and speaker 611 all interconnected to system bus 613 via user interface adapter 608, which may include, for example, a Super I/O chip integrating multiple device adapters into a single integrated circuit.

Thus, as configured in FIG. 6, processing system 600 includes processing capability in the form of processors 601, and, storage capability including system memory 614 and mass storage 604, input means such as keyboard 609 and mouse 640, and output capability including speaker 611 and display 615. In one embodiment, a portion of system memory 614 and mass storage 604 collectively store an operating system such as the AIX® operating system from IBM Corporation to coordinate the functions of the various components shown in FIG. 6.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of interacting with a collection of user opinion documents associated with a topic, the method comprising:
    obtaining opinion data for the collection of opinion documents associated with the topic, the opinion data including one or more features discussed in the opinion documents, one or more key phrases included in each feature, one or more text snippets included in each feature, and at least one sentiment expressed in each text snippet;
    providing, in a visual interface, a feature summary view of the opinion documents as a top level of a navigational hierarchy, the feature summary view identifying the features in the opinion documents associated with the topic, identifying a total number of text snippets associated with each feature, and identifying a sentiment associated with each of the text snippets;
    allowing user navigation from the top level to a lower level of the navigational hierarchy, displaying more details about a text snippet as compared to the feature summary view while continuing to provide the feature summary view;
    allowing user manipulation of the visual interface to indicate: i) an association error identifying a text snippet of the one or more text snippets as being associated with an erroneous sentiment or an erroneous feature of the one or more features and ii) a proposed correction identifying an alternative sentiment or an alternative feature with which to associate the text snippet;
    receiving first opinion error data indicative of user manipulations of the visual interface by a first group of users, each of the user manipulations of the visual interface by the first group of users indicating a same association error between a particular text snippet of the one or more text snippets and a particular erroneous sentiment or a particular erroneous feature;
    determining that a number of users in the first group of users is greater than or equal to a first threshold value;
    receiving second opinion error data indicative of user manipulations of the visual interface by a second group of users, each of the user manipulations by the second group of users indicating a same proposed correction identifying a particular alternative sentiment or a particular alternative feature with which to associate the particular text snippet;
    determining that a number of users in the second group of users is greater than or equal to a second threshold value; and
    updating the opinion data to disassociate the particular text snippet from the particular erroneous sentiment or the particular erroneous feature and associate the particular text snippet with the particular alternative sentiment or the particular alternative feature.

2. The method of claim 1, wherein the feature summary view does not include information about the text snippets other than the total number of text snippets and sentiment associated with each of the text snippets.

3. The method of claim 1, wherein the providing a feature summary view further comprises displaying a respective feature control for each feature in the opinion documents and displaying a respective snippet summary control adjacent to each feature control.

4. The method of claim 3, wherein each feature control corresponds to text of the corresponding feature.

5. The method of claim 3, wherein each snippet summary control summarizes all the text snippets included in one of the features.

6. The method of claim 3, wherein each snippet summary control includes a respective snippet symbol control for each text snippet included in one of the features, each snippet symbol control displaying an instance of a same symbol, the instances arranged in an array.

7. The method of claim 3, further comprising in response to user interaction with one of the snippet symbol controls, displaying the text snippet that corresponds to the interacted-with snippet symbol control.

8. The method of claim 1, further comprising providing, as the lower level of the navigational hierarchy, at least one of a text snippet view and a full text view.

9. A computer program product for interacting with a collection of user opinion documents associated with a topic, the computer program product comprising a non-transitory computer readable storage medium having program code embodied therewith, the program code executable by a processor to:
    obtain opinion data for the collection of opinion documents associated with the topic, the opinion data including one or more features discussed in the opinion documents, one or more key phrase included in the features, one or more text snippets included in the features, and at least one sentiment expressed in the features;
    provide, in a visual interface, a feature summary view of the opinion documents as a top level of a navigational hierarchy, the feature summary view identifying the features in the opinion documents associated with the topic, identifying a total number of text snippets associated with each feature, and identifying a sentiment associated with each of the text snippets;

allow user navigation from the top level to a lower level of the navigational hierarchy while continuing to provide the feature summary view;

allow user manipulation of the visual interface to indicate: i) an association error identifying a text snippet of the one or more text snippets as being associated with an erroneous sentiment or an erroneous feature of the one or more features and ii) a proposed correction identifying an alternative sentiment or an alternative feature with which to associate the text snippet;

receive first opinion error data indicative of user manipulations of the visual interface by a first group of users, each of the user manipulations of the visual interface by the first group of users indicating a same association error between a particular text snippet of the one or more text snippets and a particular erroneous sentiment or a particular erroneous feature;

determine that a number of users in the first group of users is greater than or equal to a first threshold value;

receive second opinion error data indicative of user manipulations of the visual interface by a second group of users, each of the user manipulations by the second group of users indicating a same proposed correction identifying a particular alternative sentiment or a particular alternative feature with which to associate the particular text snippet;

determine that a number of users in the second group of users is greater than or equal to a second threshold value; and update the opinion data to disassociate the particular text snippet from the particular erroneous sentiment or the particular erroneous feature and associate the particular text snippet with the particular alternative sentiment or the particular alternative feature.

10. The computer program product of claim 9, wherein the providing a feature summary view further comprises displaying a respective feature text control for each feature in the opinion documents and displaying a respective snippet summary control adjacent each feature control that summarizes all the text snippets included in one of the features.

11. The computer program product of claim 9, wherein each snippet summary control includes a respective snippet symbol control for each text snippet included in one of the features, each snippet symbol control displaying an instance of a same symbol, the instances arranged in an array.

12. The computer program product of claim 9, further comprising displaying, for each feature, one or more key phrases associated with the feature.

13. The computer program product of claim 9, wherein the allowing user navigation from the top level to the lower level further comprises:
receiving a user activation of one of the instances of the same symbol; and
displaying, as the lower level of the navigational hierarchy, text of the snippet corresponding to the activated symbol instance.

14. A system for interacting with a collection of user opinion documents associated with a topic, the system comprising:
a memory having computer readable computer instructions; and
a processor for executing the computer readable instructions, the computer readable instructions including instructions for:
obtaining opinion data for the collection of opinion documents associated with the topic, the opinion data including one or more features discussed in the opinion documents, one or more key phrases included in each feature, one or more text snippets included in each feature, and at least one sentiment expressed in each text snippet;
providing, in a visual interface, a feature summary view of the opinion documents as a top level of a navigational hierarchy, the feature summary view identifying the features in the opinion documents associated with the topic, identifying a total number of text snippets associated with each feature, and identifying a sentiment associated with each of the text snippets;
allowing user navigation from the top level to a lower level of the navigational hierarchy while continuing to provide the feature summary view;
allowing user manipulation of the visual interface to indicate: i) an association error identifying a text snippet of the one or more text snippets as being associated with an erroneous sentiment or an erroneous feature of the one or more features and ii) a proposed correction identifying an alternative sentiment or an alternative feature with which to associate the text snippet;
receiving first opinion error data indicative of user manipulations of the visual interface by a first group of users, each of the user manipulations of the visual interface by the first group of users indicating a same association error between a particular text snippet of the one or more text snippets and a particular erroneous sentiment or a particular erroneous feature;
determining that a number of users in the first group of users is greater than or equal to a first threshold value;
receiving second opinion error data indicative of user manipulations of the visual interface by a second group of users, each of the user manipulations by the second group of users indicating a same proposed correction identifying a particular alternative sentiment or a particular alternative feature with which to associate the particular text snippet;
determining that a number of users in the second group of users is greater than or equal to a second threshold value; and
updating the opinion data to disassociate the particular text snippet from the particular erroneous sentiment or the particular erroneous feature and associate the particular text snippet with the particular alternative sentiment or the particular alternative feature.

15. The system of claim 14, the computer readable instructions further comprising instructions for:
allowing user manipulation of the visual interface to modify text of one of the features; and
updating the opinion data to reflect the modified feature.

16. The system of claim 14, the computer readable instructions further comprising instructions for:
determining that the second group of users comprises more users than a third group of users associated with user manipulations of the visual interface indicative of a different proposed correction of the association between the particular text snippet and the particular erroneous sentiment or the particular erroneous feature,
wherein the opinion data is updated to reflect the proposed correction indicated by the user manipulations by the second group of users instead of the different proposed correction indicated by the user manipulations associated with the third group of users based at least in part on determining that the second group of users comprises more users than the third group of users.

* * * * *